United States Patent
Geng et al.

(10) Patent No.: US 12,069,569 B2
(45) Date of Patent: Aug. 20, 2024

(54) COMMUNICATION METHOD AND APPARATUS

(71) Applicant: HUAWEI TECHNOLOGIES CO., LTD., Guangdong (CN)

(72) Inventors: Tingting Geng, Shanghai (CN); Le Yan, Shenzhen (CN); Hongping Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 425 days.

(21) Appl. No.: 17/407,847

(22) Filed: Aug. 20, 2021

(65) Prior Publication Data

US 2021/0385745 A1 Dec. 9, 2021

Related U.S. Application Data

(63) Continuation of application No. PCT/CN2020/074649, filed on Feb. 10, 2020.

(30) Foreign Application Priority Data

Feb. 20, 2019 (CN) .......................... 201910127596.4

(51) Int. Cl.
  *H04W 48/20* (2009.01)
  *H04W 24/10* (2009.01)
  *H04W 48/16* (2009.01)

(52) U.S. Cl.
  CPC .......... *H04W 48/20* (2013.01); *H04W 24/10* (2013.01); *H04W 48/16* (2013.01)

(58) Field of Classification Search
  CPC ...... H04W 48/20; H04W 24/10; H04W 48/16
  See application file for complete search history.

(56) References Cited

U.S. PATENT DOCUMENTS 8,339,981 B2 12/2012 Jeong et al.
2015/0296486 A1* 10/2015 Park .................. H04W 76/15
  370/329

(Continued)

FOREIGN PATENT DOCUMENTS

CN 1852199 A 10/2006
CN 101686505 3/2010

(Continued)

OTHER PUBLICATIONS

Office Action issued in Indian Application No. 202117039238 on Mar. 25, 2022, 7 pages.

(Continued)

*Primary Examiner* — Derrick V Rose
(74) *Attorney, Agent, or Firm* — Fish & Richardson P.C.

(57) ABSTRACT

The present disclosure relates to communication methods and apparatus. On one example method, a terminal device obtains measurement results of N cells, where the N cells include M non-public network cells, where N is an integer greater than or equal to 1, and where M is an integer greater than or equal to 0. The terminal device determines, based on the measurement results of the N cells and measurement result offset values corresponding to H first cells in the N cells, a target cell on which the terminal device is to camp, where H is an integer greater than or equal to 1, and where H≤N.

6 Claims, 6 Drawing Sheets

(56) References Cited

U.S. PATENT DOCUMENTS

2015/0327162 A1  11/2015 Lee et al.
2018/0192365 A1* 7/2018 Feng .................. H04W 72/0453
2021/0084583 A1* 3/2021 Niu ....................... H04W 48/20

FOREIGN PATENT DOCUMENTS

| CN | 106162766 | 11/2016 |
| CN | 108235399 A | 6/2018 |
| EP | 1947889 A2 | 7/2008 |
| WO | 2009020361 A2 | 2/2009 |
| WO | 2009020874 A1 | 2/2009 |
| WO | 2012138121 A2 | 10/2012 |

OTHER PUBLICATIONS

Office Action issued in Chinese Application No. 201910127596.4 on Aug. 31, 2021, 12 pages (with English translation).
OPPO, "New Solution for Type a Network Access Control during Handover," SA WG2 Meeting #129, S2-1811377, Dongguan, China, Oct. 15-19, 2018, 3 pages.
PCT International Search Report and Written Opinion issued in International Application No. PCT/CN2020/074649 on Apr. 24, 2020, 15 pages (with English translation).
Extended European Search Report issued in European Application No. 20758905.2 on Feb. 25, 2022, 11 pages.

* cited by examiner

COMMUNICATION METHOD AND APPARATUS

CROSS-REFERENCE TO RELATED APPLICATIONS

This application is a continuation of International Application No. PCT/CN2020/074649, filed on Feb. 10, 2020, which claims priority to Chinese Patent Application No. 201910127596.4, filed on Feb. 20, 2019. The disclosures of the aforementioned applications are hereby incorporated by reference in their entireties.

TECHNICAL FIELD

This application relates to the field of communication technologies, and in particular, to a communication method and apparatus.

BACKGROUND

Currently, a concept of non-public network (non-public network, NPN for short) is proposed in communication development. The non-public network is a concept relative to that of public network, and may be understood as a private network, for example, an internal network established by a company, a school, or a factory. Generally, a non-public network identity (NPN identification, NPN ID) can be used to identify a non-public network type. Different terminals support different NPN IDs, and a terminal can camp only on a non-public network corresponding to an NPN ID supported by the terminal, and can initiate a service only in the non-public network corresponding to the NPN ID supported by the terminal. In terms of deployment, a dedicated base station and core network may be configured for the non-public network. The non-public network may alternatively be a slice (slice) of the public network, and in this case, the non-public network is a non-standalone non-public network (non-stand-alone non-public network, NSA NPN for short). The non-public network may alternatively be a cell deployed by a public network operator, and in this case, the non-public network may share a core network with the public network.

After the non-public network is introduced, there are the following three types of terminal devices: a terminal device supporting only the non-public network, a terminal device supporting only the public network, and a terminal device supporting both the public network and the non-public network. The terminal device that does not support the non-public network cannot perform normal service transmission in the non-public network, and the terminal device that does not support the public network cannot perform normal service transmission in the public network. For the terminal device supporting only the non-public network, because the terminal device does not support the public network, the terminal device needs to be prevented from selecting or reselecting a cell of the public network to camp on. For the terminal device supporting only the public network, because the terminal device does not support the non-public network, the terminal device needs to be prevented from selecting or reselecting a cell of the non-public network to camp on. Therefore, efficiency of determining, by a terminal, a cell on which the terminal is to camp is not high.

SUMMARY

This application provides a communication method and apparatus, to improve efficiency of determining, by a terminal, a cell on which the terminal is to camp.

A first aspect provides a communication method, where the communication method includes: A terminal device obtains measurement results of N cells, where the N cells include M non-public network cells, where N is an integer greater than or equal to 1, and M is an integer greater than or equal to 0. The terminal device determines, based on the measurement results of the N cells and measurement result offset values corresponding to H first cells in the N cells, a target cell on which the terminal device is to camp, where H is an integer greater than or equal to 1, and H≤N.

For the measurement result offset values,
optionally, different cells correspond to different measurement result offset values.

Optionally, different frequency channel numbers correspond to different measurement result offset values.

Optionally, different non-public networks correspond to different measurement result offset values and/or different public networks correspond to different measurement result offset values.

Optionally, a measurement result offset value corresponding to a public network cell is 0 or a measurement result offset value corresponding to the non-public network cell is 0.

In this solution, when the terminal device is a terminal device that supports at least a non-public network, introducing the measurement result offset value can optimize a measurement result of the non-public network cell or the public network cell, so that the terminal device is more likely to camp on the non-public network cell, thereby improving efficiency of determining, by the terminal device, a cell on which the terminal device is to camp. Generally, because of less competition in the non-public network, a terminal device that supports both the non-public network and the public network has a faster communication speed in the non-public network. The method in this solution can further enable the terminal device that supports both the non-public network and the public network to be more likely to camp on the public network cell. Because a deployment range of the public network cell is wider, when the terminal device that supports both the non-public network and the public network camps on the public network cell, that the terminal device camps on the public network can be more likely to ensure service continuity.

In addition, in this solution, when the terminal device is a terminal device that supports only a public network, introducing the measurement result offset value can optimize a measurement result of the non-public network cell or the public network cell, so that the terminal device is more likely to camp on the public network cell, thereby improving efficiency of determining, by the terminal device, a cell on which the terminal device is to camp.

With reference to the first aspect, in a possible implementation of the first aspect, the communication method further includes:

The terminal device receives a correspondence from a network device.

The terminal device determines, based on the correspondence, the measurement result offset values corresponding to the H first cells in the N cells.

The correspondence is any one of the following:
a correspondence between L cells and L measurement result offset values, where the L cells are in a one-to-one correspondence with the L measurement result offset values, where L is an integer greater than or equal to 1, the L cells include a non-public network cell and/or a public network cell, and the L cells include the H first cells;

a correspondence between K frequency channel numbers and K measurement result offset values, where the K frequency channel numbers are in a one-to-one correspondence with the K measurement result offset values, where K is an integer greater than or equal to 1, the K frequency channel numbers include a frequency channel number corresponding to a non-public network and/or a frequency channel number corresponding to a public network and/or a frequency channel number corresponding to both a non-public network and a public network, and cells corresponding to the K frequency channel numbers include the H first cells; and a correspondence between S networks and S measurement result offset values, where the S networks are in a one-to-one correspondence with the S measurement result offset values, where S is an integer greater than or equal to 1, the S networks include a non-public network and/or a public network, and cells corresponding to the S networks include the H first cells.

This solution provides a method for obtaining, by the terminal device, the measurement result offset values of the H first cells in the N cells.

With reference to the first aspect, in a possible implementation of the first aspect, the communication method further includes:

The terminal device receives non-public network measurement configuration information from the network device, where the non-public network measurement configuration information is used by the terminal device to determine the measurement result offset values corresponding to the H first cells in the N cells and/or is used by the terminal device to determine a cell to be measured.

The non-public network measurement configuration information includes first information, second information, third information, fourth information, or fifth information, where the first information includes identification information of a non-public network and frequency channel number information corresponding to the non-public network, the second information includes identification information of a non-public network and non-public network cell information corresponding to the non-public network, the third information includes frequency channel number information corresponding to a non-public network and non-public network cell information corresponding to a frequency channel number corresponding to the non-public network, the fourth information includes non-public network cell information, and the fifth information includes frequency channel number information corresponding to a non-public network.

With reference to the first aspect, in a possible implementation of the first aspect, the non-public network measurement configuration information may alternatively include identification information of a non-public network, frequency channel number information corresponding to the non-public network, and non-public network cell information corresponding to a frequency channel number corresponding to the non-public network.

The non-public network cell information includes at least one of the following: a physical cell identifier PCI of the non-public network cell, a cell identifier cell ID, or a cell global identifier CGI.

In this solution, the terminal device receives the non-public network measurement configuration information from the network device, and the terminal device may determine, based on the non-public network measurement configuration information and the correspondence, the measurement result offset values corresponding to the H first cells in the N cells, or determine, based on the non-public network measurement configuration information, a cell to be measured. This further improves the efficiency of determining, by the terminal device, a cell on which the terminal device is to camp.

With reference to the first aspect, in a possible implementation of the first aspect, the communication method further includes:

The terminal device receives second indication information from the network device, where the second indication information is used to indicate at least one of the following:

at least one of a priority of a cell directly supporting a non-public network service, a priority of a cell indirectly supporting the non-public network service, or a priority of the public network cell.

Further, the non-public network measurement configuration information further includes first indication information, and the first indication information is used to indicate a manner in which the non-public network cell supports the non-public network service.

In this solution, the terminal device can camp on a high-priority cell.

A second aspect provides a communication method, where the communication method includes: A network device generates a correspondence. The network device sends the correspondence to a terminal device, where the correspondence is used by the terminal device to determine measurement result offset values of H first cells in N cells, and the N cells are cells whose measurement results are obtained by the terminal device.

The correspondence is any one of the following:

a correspondence between L cells and L measurement result offset values, where the L cells are in a one-to-one correspondence with the L measurement result offset values, where L is an integer greater than or equal to 1, the L cells include a non-public network cell and/or a public network cell, and the L cells include the H first cells;

a correspondence between K frequency channel numbers and K measurement result offset values, where the K frequency channel numbers are in a one-to-one correspondence with the K measurement result offset values, where K is an integer greater than or equal to 1, the K frequency channel numbers include a frequency channel number corresponding to a non-public network and/or a frequency channel number corresponding to a public network and/or a frequency channel number corresponding to both a non-public network and a public network, and cells corresponding to the K frequency channel numbers include the H first cells; and a correspondence between S networks and S measurement result offset values, where the S networks are in a one-to-one correspondence with the S measurement result offset values, where S is an integer greater than or equal to 1, the S networks include a non-public network and/or a public network, and cells corresponding to the S networks include the H first cells.

In this solution, the network device sends, to the terminal device, the correspondence used to obtain the measurement result offset values of the H first cells in the N cells, so that the terminal device can obtain the measurement result offset values of the H first cells in the N cells. In this way, the measurement results of the N cells can be optimized and updated, so that a terminal device supporting the non-public network is more likely to camp on the non-public network cell, and a terminal device supporting the public network is more likely to camp on the public network cell, thereby improving efficiency of determining, by the terminal device, a cell on which the terminal device is to camp.

With reference to the second aspect, in a possible implementation of the second aspect, the communication method further includes: The network device sends non-public network measurement configuration information to the terminal device, where the non-public network measurement configuration information is used by the terminal device to determine the measurement result offset values corresponding to the H first cells in the N cells and/or is used by the terminal device to determine a cell to be measured.

The non-public network measurement configuration information includes first information, second information, third information, fourth information, or fifth information, where the first information includes identification information of a non-public network and frequency channel number information corresponding to the non-public network, the second information includes identification information of a non-public network and non-public network cell information corresponding to the non-public network, the third information includes frequency channel number information corresponding to a non-public network and non-public network cell information corresponding to a frequency channel number corresponding to the non-public network, the fourth information includes non-public network cell information, and the fifth information includes frequency channel number information corresponding to a non-public network.

With reference to the second aspect, in a possible implementation of the second aspect, the non-public network measurement configuration information may alternatively include identification information of a non-public network, frequency channel number information corresponding to the non-public network, and non-public network cell information corresponding to a frequency channel number corresponding to the non-public network.

In this solution, the network device sends the non-public network measurement configuration information to the terminal device. This further improves the efficiency of determining, by the terminal device, a cell on which the terminal device is to camp.

A third aspect provides a communication method, where the communication method includes: A terminal device receives non-public network measurement configuration information from a network device. The terminal device determines, based on the non-public network measurement configuration information, a target cell on which the terminal device is to camp.

The non-public network measurement configuration information includes first information, second information, third information, fourth information, or fifth information, where the first information includes identification information of a non-public network and frequency channel number information corresponding to the non-public network, the second information includes identification information of a non-public network and non-public network cell information corresponding to the non-public network, the third information includes frequency channel number information corresponding to a non-public network and non-public network cell information corresponding to a frequency channel number corresponding to the non-public network, the fourth information includes non-public network cell information, and the fifth information includes frequency channel number information corresponding to a non-public network.

In this solution, the terminal device receives the non-public network measurement configuration information from the network device, so that a terminal supporting the non-public network can determine, only in non-public network cells, a cell on which the terminal device is to camp, and a terminal supporting a public network can determine, only in public network cells, a cell on which the terminal device is to camp, thereby narrowing a cell selection or reselection range, and improving efficiency of determining, by the terminal device, a cell on which the terminal device is to camp.

With reference to the third aspect, in a possible implementation of the third aspect, that the terminal device determines, based on the non-public network measurement configuration information, a target cell on which the terminal device is to camp includes:

The terminal device obtains measurement results of N cells based on the non-public network measurement configuration information, where N is an integer greater than or equal to 1.

The terminal device determines, based on the measurement results of the N cells, the target cell on which the terminal device is to camp.

With reference to the third aspect, in a possible implementation of the third aspect, that the terminal device determines, based on the non-public network measurement configuration information, a target cell on which the terminal device is to camp includes:

The terminal device determines an identity of at least one target non-public network supported by the terminal.

The terminal device obtains measurement results of N cells based on the non-public network measurement configuration information and the identity of the at least one target non-public network, where N is an integer greater than or equal to 1.

The terminal device determines, based on the measurement results of the N cells, the target cell on which the terminal device is to camp.

In this solution, the cell selection or reselection range is further narrowed. This further improves the efficiency of determining, by the terminal device, a cell on which the terminal device is to camp.

A fourth aspect provides a communication apparatus, where the communication apparatus includes:
  a processing module, configured to obtain measurement results of N cells, where the N cells include M non-public network cells, where N is an integer greater than or equal to 1, and M is an integer greater than or equal to 0.

The processing module is further configured to determine, based on the measurement results of the N cells and measurement result offset values corresponding to H first cells in the N cells, a target cell on which the communication apparatus is to camp, where H is an integer greater than or equal to 1, and H≤N.

For the measurement result offset values, optionally, different cells correspond to different measurement result offset values.

Optionally, different frequency channel numbers correspond to different measurement result offset values.

Optionally, different non-public networks correspond to different measurement result offset values and/or different public networks correspond to different measurement result offset values.

Optionally, a measurement result offset value corresponding to a public network cell is 0 or a measurement result offset value corresponding to the non-public network cell is 0.

With reference to the fourth aspect, in a possible implementation of the fourth aspect, the communication apparatus further includes the transceiver module.

The transceiver module is configured to receive a correspondence from a network device.

The processing module is specifically configured to determine, based on the correspondence, the measurement result offset values corresponding to the H first cells in the N cells.

The correspondence is any one of the following:
- a correspondence between L cells and L measurement result offset values, where the L cells are in a one-to-one correspondence with the L measurement result offset values, where L is an integer greater than or equal to 1, the L cells include a non-public network cell and/or a public network cell, and the L cells include the H first cells;
- a correspondence between K frequency channel numbers and K measurement result offset values, where the K frequency channel numbers are in a one-to-one correspondence with the K measurement result offset values, where K is an integer greater than or equal to 1, the K frequency channel numbers include a frequency channel number corresponding to a non-public network and/or a frequency channel number corresponding to a public network and/or a frequency channel number corresponding to both a non-public network and a public network, and cells corresponding to the K frequency channel numbers include the H first cells; and
- a correspondence between S networks and S measurement result offset values, where the S networks are in a one-to-one correspondence with the S measurement result offset values, where S is an integer greater than or equal to 1, the S networks include a non-public network and/or a public network, and cells corresponding to the S networks include the H first cells.

With reference to the fourth aspect, in a possible implementation of the fourth aspect, the communication apparatus further includes the transceiver module.

The transceiver module is configured to receive non-public network measurement configuration information from the network device, where the non-public network measurement configuration information is used by the communication apparatus to determine the measurement result offset values corresponding to the H first cells in the N cells and/or is used by the communication apparatus to determine a cell to be measured.

The non-public network measurement configuration information includes first information, second information, third information, fourth information, or fifth information, where the first information includes identification information of a non-public network and frequency channel number information corresponding to the non-public network, the second information includes identification information of a non-public network and non-public network cell information corresponding to the non-public network, the third information includes frequency channel number information corresponding to a non-public network and non-public network cell information corresponding to a frequency channel number corresponding to the non-public network, the fourth information includes non-public network cell information, and the fifth information includes frequency channel number information corresponding to a non-public network.

The non-public network cell information includes at least one of the following: a physical cell identifier PCI of the non-public network cell, a cell identifier cell ID, or a cell global identifier CGI.

Further, the non-public network measurement configuration information further includes first indication information, and the first indication information is used to indicate a manner in which the non-public network cell supports a non-public network service.

With reference to the fourth aspect, in a possible implementation of the fourth aspect, the non-public network measurement configuration information may alternatively include identification information of a non-public network, frequency channel number information corresponding to the non-public network, and non-public network cell information corresponding to a frequency channel number corresponding to the non-public network.

With reference to the fourth aspect, in a possible implementation of the fourth aspect, the communication apparatus further includes the transceiver module.

The transceiver module is configured to receive second indication information from the network device, where the second indication information is used to indicate at least one of the following:
- at least one of a priority of a cell directly supporting the non-public network service, a priority of a cell indirectly supporting the non-public network service, or a priority of the public network cell.

A fifth aspect provides a communication apparatus, where the communication apparatus includes:
- a generation module, configured to generate a correspondence; and
- a transceiver module, configured to send the correspondence to a terminal device, where the correspondence is used by the terminal device to determine measurement result offset values of H first cells in N cells, and the N cells are cells whose measurement results are obtained by the terminal device.

The correspondence is any one of the following:
- a correspondence between L cells and L measurement result offset values, where the L cells are in a one-to-one correspondence with the L measurement result offset values, where L is an integer greater than or equal to 1, the L cells include a non-public network cell and/or a public network cell, and the L cells include the H first cells;
- a correspondence between K frequency channel numbers and K measurement result offset values, where the K frequency channel numbers are in a one-to-one correspondence with the K measurement result offset values, where K is an integer greater than or equal to 1, the K frequency channel numbers include a frequency channel number corresponding to a non-public network and/or a frequency channel number corresponding to a public network and/or a frequency channel number corresponding to both a non-public network and a public network, and cells corresponding to the K frequency channel numbers include the H first cells; and
- a correspondence between S networks and S measurement result offset values, where the S networks are in a one-to-one correspondence with the S measurement result offset values, where S is an integer greater than or equal to 1, the S networks include a non-public network and/or a public network, and cells corresponding to the S networks include the H first cells.

With reference to the fifth aspect, in a possible implementation of the fifth aspect, the transceiver module is further configured to send non-public network measurement configuration information to the terminal device, where the non-public network measurement configuration information is used by the terminal device to determine the measurement result offset values corresponding to the H first cells in the N cells and/or is used by the terminal device to determine a cell to be measured.

The non-public network measurement configuration information includes first information, second information, third information, fourth information, or fifth information, where the first information includes identification information of a non-public network and frequency channel number information corresponding to the non-public network, the second information includes identification information of a non-public network and non-public network cell information corresponding to the non-public network, the third information includes frequency channel number information corresponding to a non-public network and non-public network cell information corresponding to a frequency channel number corresponding to the non-public network, the fourth information includes non-public network cell information, and the fifth information includes frequency channel number information corresponding to a non-public network.

With reference to the fifth aspect, in a possible implementation of the fifth aspect, the non-public network measurement configuration information may alternatively include identification information of a non-public network, frequency channel number information corresponding to the non-public network, and non-public network cell information corresponding to a frequency channel number corresponding to the non-public network.

A sixth aspect provides a communication apparatus, where the communication apparatus includes:
a transceiver module, configured to receive non-public network measurement configuration information from a network device; and
a processing module, configured to determine, based on the non-public network measurement configuration information, a target cell on which the communication apparatus is to camp.

The non-public network measurement configuration information includes first information, second information, third information, fourth information, or fifth information, where the first information includes identification information of a non-public network and frequency channel number information corresponding to the non-public network, the second information includes identification information of a non-public network and non-public network cell information corresponding to the non-public network, the third information includes frequency channel number information corresponding to a non-public network and non-public network cell information corresponding to a frequency channel number corresponding to the non-public network, the fourth information includes non-public network cell information, and the fifth information includes frequency channel number information corresponding to a non-public network.

With reference to the sixth aspect, in a possible implementation of the sixth aspect, the non-public network measurement configuration information may alternatively include identification information of a non-public network, frequency channel number information corresponding to the non-public network, and non-public network cell information corresponding to a frequency channel number corresponding to the non-public network.

With reference to the sixth aspect, in a possible implementation of the sixth aspect, the processing module is specifically configured to:
obtain measurement results of N cells based on the non-public network measurement configuration information, where N is an integer greater than or equal to 1; and
determine, based on the measurement results of the N cells, the target cell on which the communication apparatus is to camp.

With reference to the sixth aspect, in a possible implementation of the sixth aspect, the processing module is specifically configured to:
determine an identity of at least one target non-public network supported by the communication apparatus;
obtain measurement results of N cells based on the non-public network measurement configuration information and the identity of the at least one target non-public network, where N is an integer greater than or equal to 1; and
determine, based on the measurement results of the N cells, the target cell on which the communication apparatus is to camp.

A seventh aspect provides a communication apparatus, where the communication apparatus is configured to implement the communication method according to any one of the first aspect or the possible implementations of the first aspect.

An eighth aspect provides a communication apparatus, where the communication apparatus is configured to implement the communication method according to any one of the second aspect or the possible implementations of the second aspect.

A ninth aspect provides a communication apparatus, where the communication apparatus is configured to implement the communication method according to any one of the third aspect or the possible implementations of the third aspect.

A tenth aspect provides a readable storage medium, where the readable storage medium stores a computer program; and when the computer program is executed, the communication method according to any one of the first aspect or the possible implementations of the first aspect is implemented.

An eleventh aspect provides a readable storage medium, where the readable storage medium stores a computer program; and when the computer program is executed, the communication method according to any one of the second aspect or the possible implementations of the second aspect is implemented.

A twelfth aspect provides a readable storage medium, where the readable storage medium stores a computer program; and when the computer program is executed, the communication method according to any one of the third aspect or the possible implementations of the third aspect is implemented.

In this application, when the terminal device is a terminal device that supports at least the non-public network, introducing the measurement result offset value can optimize a measurement result of the non-public network cell or the public network cell, so that the terminal device is more likely to camp on the non-public network cell, thereby improving efficiency of determining, by the terminal device, a cell on which the terminal device is to camp. Generally, because of less competition in the non-public network, a terminal device that supports both the non-public network and the public network has a faster communication speed in the non-public network. The method in this solution can further enable the terminal device that supports both the non-public network and the public network to be more likely to camp on the public network cell. Because a deployment range of the public network cell is wider, when the terminal device that supports both the non-public network and the public network camps on the public network cell, that the terminal device camps on the public network can be more likely to ensure service continuity. In addition, in this application, when the terminal device is a terminal device that supports only the public network, introducing the measurement result offset value can optimize a measurement result of the non-public network cell or the public network cell, so that the terminal device is more likely to camp on the public network cell, thereby improving efficiency of determining, by the terminal device, a cell on which the terminal device is to camp.

DESCRIPTION OF EMBODIMENTS

Figure 1:
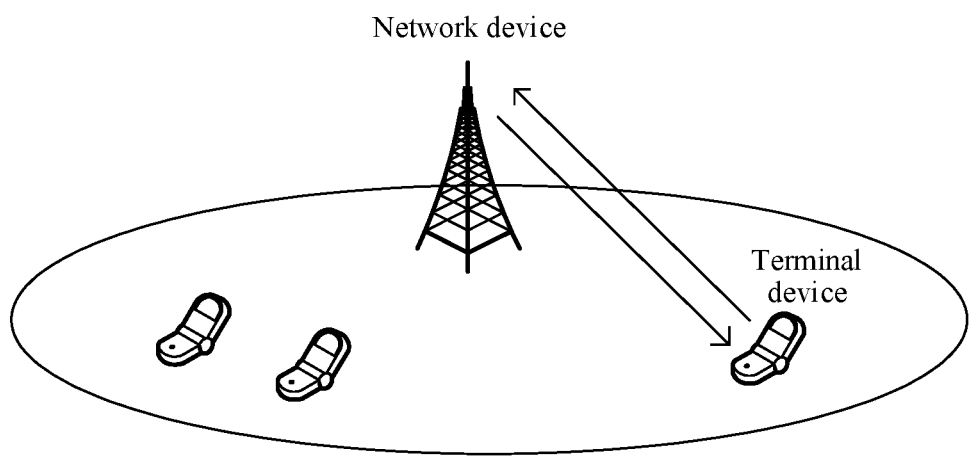
FIG. 1 is a schematic diagram of a system architecture according to an embodiment of this application.

In this application, "at least one" refers to one or more, and "a plurality of" refers to two or more. The term "and/or" describes an association relationship for describing associated objects and represents that three relationships may exist. For example, A and/or B may represent the following three cases: Only A exists, both A and B exist, and only B exists, where A and B may be singular or plural. The character "/" generally indicates an "or" relationship between the associated objects. "At least one item (piece) of the following" or a similar expression thereof refers to any combination of these items, including any combination of singular items (pieces) or plural items (pieces). For example, at least one item (piece) of a, b, or c may indicate a, b, c, a and b, a and c, b and c, or a, b, and c, where a, b, and c may be singular or plural. In this application, the terms "first", "second", and the like are used to distinguish between similar objects but do not necessarily indicate a specific order or sequence.

The following describes technical solutions of this application with reference to the accompanying drawings.

It should be understood that the technical solutions in the embodiments of this application may be applied to a long term evolution (long term evolution, LTE) architecture, or may be applied to a universal mobile telecommunications system (universal mobile telecommunications system, UMTS) terrestrial radio access network (UMTS terrestrial radio access network, UTRAN) architecture, or a global system for mobile communications (global system for mobile communication, GSM)/enhanced data rates for GSM evolution (enhanced data rate for gSM evolution, EDGE) system radio access network (GSM EDGE radio access network, GERAN) architecture. In the UTRAN architecture or/the GERAN architecture, a function of an MME is completed by a serving general packet radio service (general packet radio service, GPRS) support node (serving GPRS support, SGSN), and a function of an SGW/a PGW is completed by a gateway GPRS support node (Gateway GPRS Support Node, GGSN). The technical solutions in the embodiments of this application may be further applied to other communication systems, such as a public land mobile network (Public Land Mobile Network, PLMN) system, or even a future 5G communication system or a communication system after 5G. This is not limited in the embodiments of this application.

The embodiments of this application relate to a terminal device. The terminal device may be a device that includes a wireless transceiver function and can cooperate with a network device to provide a communication service for a user. Specifically, the terminal device may be user equipment (user equipment, UE), an access terminal device, a subscriber unit, a subscriber station, a mobile station, a mobile station, a remote station, a remote terminal device, a mobile device, a user terminal device, a terminal device, a wireless communications device, a user agent, or a user apparatus. For example, the terminal device may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, or a terminal device in a future 5G network or a network after 5G. This is not limited in the embodiments of this application.

The embodiments of this application further relate to a network device. The network device may be a device configured to communicate with the terminal device. For example, the network device may be a base transceiver station (base transceiver station, BTS) in a GSM system or CDMA, may be a NodeB (nodeB, NB) in a WCDMA system, or may be an evolved NodeB (evolutional node B, eNB or eNodeB) in an LTE system. Alternatively, the network device may be a relay station, an access point, a vehicle-mounted device, a wearable device, a network-side device in a future 5G network or a network after 5G, a network device in a future evolved PLMN network, or the like.

The network device in the embodiments of this application may also be referred to as a radio access network (radio access network, RAN) device. The RAN device is connected to the terminal device, to receive data from the terminal device and send the data to a core network device. The RAN device corresponds to different devices in different communication systems, for example, corresponds to a base station and a base station controller in a 2G system, corresponds to a base station and a radio network controller (radio network controller, RNC) in a 3G system, corresponds to an evolved NodeB (evolutional node B, eNB) in a 4G system, and in a 5G system, corresponds to an access network device (for example, a gNB, a CU, or a DU) in a new radio access system (new radio access technology, NR).

For ease of understanding of this application, some elements introduced in descriptions of this application are first described herein.

Cell selection: When a terminal device is powered on or a situation such as a radio link failure occurs, the terminal device performs a cell search process and selects a suitable cell to camp on as soon as possible. This process is referred to as "cell selection".

Cell reselection: After the terminal device camps on one cell, with movement of the terminal device, the terminal device may need to move, for camping, to another cell having a higher priority or a better signal. This is a cell reselection process.

For cell selection and cell reselection methods in the conventional technology in the embodiments of this application, refer to related descriptions in the 3rd generation partnership project (3rd generation partnership project, 3GPP) technical specification (technical specification, TS) 36.304 or TS 38.304. Details are as follows:

First, the cell selection method is described.

A terminal device evaluates, according to an S criterion, whether a current cell that is being measured is a suitable cell. If the current cell is a cell that meets the S criterion, a cell selection process is completed. If the current cell does not meet the S criterion, the terminal device continues to perform searching until the terminal device finds a cell that meets the S criterion and camps on the cell.

A formula of the S criterion is shown in a formula 1:

$$S_{rxlev}=Q_{rxlevmeas}-(Q_{rxlevmin}-Q_{rxlevminoffset})-P_{compensation} \quad \text{formula 1}$$

$S_{rxlev}$ is a level value (dB) calculated by the terminal device in the cell selection process. $Q_{rxlevmeas}$ is a received signal strength value (dBm) obtained by the terminal device through measurement in the current cell, and the received signal strength value is a reference signal received power (reference signal receiving power, RSRP for short) obtained through measurement in the current cell. $Q_{rxlevmin}$ is a minimum received signal strength value (dBm) required by the current cell, and the minimum received signal strength value required by the current cell is indicated in a minimum receive level q-RxLevMin of a system information block 1 (system information block type1, SIB1 for short) of the current cell. $P_{compensation}$ is a larger value in (PEMAX−PUMAX) and 0, and a unit is dB. PEMAX is a maximum allowed transmit power that is of the terminal device and that is set by a system when the terminal device accesses the current cell, and PUMAX is a maximum output power supported by a capability of the terminal device. $Q_{rxlevminoffset}$ is an offset value of $Q_{rxlevmin}$, $Q_{rxlevminoffset}$ is carried in a system message of the current cell, and $Q_{mrxlevminoffset}$ participates calculation of $S_{rxlev}$ only when the terminal device normally camps on a virtual private mobile network (Virtual Private Mobile Network, VPMN for short) and periodically searches for a high-priority public land mobile network (Public Land Mobile Network, PLMN for short) for cell selection.

When $S_{rxlev}$ calculated by the terminal device is greater than 0, the terminal device determines that the current cell is a cell meeting the S criterion, and the terminal device selects the current cell to camp on; when $S_{rxlev}$ calculated by the terminal device is less than or equal to 0, the terminal device determines that the current cell is a cell that does not meet the S criterion, and the terminal device continues to perform searching until the terminal device finds a cell that meets the S criterion and camps on the cell.

It may be understood that, in the cell selection process, a measurement result of the current cell is $S_{rxlev}$, of the current cell, calculated by the terminal device, or the measurement result of the current cell is a value that is obtained by the terminal device and that is used to determine whether the terminal device can camp on the current cell.

Second, the cell reselection method is described.

In the cell reselection process, a criterion for measuring a cell by the terminal device is as follows:

(1) For cells whose priorities of corresponding frequencies or communications standards are higher than a priority of a frequency or communications standard of a serving cell of the terminal device, the terminal device always measures these cells, where the communications standard may be a long term evolution (long term evolution, LTE for short) standard or a new radio (new radio, NR for short) standard.

(2) If $S_{rxlev}$ of the serving cell is less than or equal to $S_{intrasearch}$, the terminal device starts intra-frequency cell measurement.

(3) If that $S_{rxlev}$ of the serving cell is less than or equal to $S_{nonintrasearch}$, or $S_{nonintrasearch}$ is not configured, the terminal device starts measurement on a cell whose priority of a corresponding frequency or communications standard is lower than the priority of the frequency or communications standard of the serving cell; or starts measurement on a cell whose priority of a corresponding frequency or communications standard is the same as the priority of the frequency or communications standard of the serving cell.

$S_{intrasearch}$ is an intra-frequency measurement start threshold, $S_{nonintrasearch}$ is an inter-frequency/inter-RAT measurement start threshold, and $S_{intrasearch}$ and $S_{nonintrasearch}$ are carried in a system message. If $S_{nontrasearch}$ is not broadcast in the system message, the terminal device starts inter-frequency cell measurement.

After the measurement, a reselection criterion is as follows:

(1) When the current cell is a cell whose priority of a corresponding frequency or communications standard is higher than the priority of the frequency or communications standard of the serving cell of the terminal device, the reselection criterion is as follows:

If $S_{rxlev}$ of the current cell is greater than $Thresh_{X,High}$ and lasts for a time period $T_{reselectionRAT}$, the terminal device determines to perform cell reselection to the current cell. $Thresh_{X,High}$ is a high-priority reselection threshold, $T_{reselectionRAT}$ is a reselection time parameter, and $Thresh_{X,High}$ and $T_{reselectionRAT}$ are carried in a system message.

(2) When the current cell is a cell whose priority of a corresponding frequency or communications standard is lower than the priority of the frequency or communications standard of the serving cell of the terminal device, the reselection criterion is as follows:

If $S_{rxlev}$ of the serving cell is less than $Thresh_{serving,low}$, and $S_{rxlev}$ of the current cell is greater than $Thresh_{x,low}$, and lasts for a time period of $T_{reselectionRAT}$, the terminal device determines to perform cell reselection to the current cell. $Thresh_{serving,low}$ is a low-priority reselection threshold of a serving frequency channel number, $Thresh_{x,low}$ is a low-priority reselection threshold, and $Thresh_{serving,low}$ and $Thresh_{x,low}$ are carried in a system message.

In the cell reselection process, for (1) and (2), a measurement result of the current cell is $S_{rxlev}$, of the current cell, calculated by the terminal device.

(3) When each measured cell is a cell whose priority of a corresponding frequency or communications standard is the same as the priority of the frequency or communications standard of the serving cell, the reselection criterion is the same as an intra-frequency cell reselection criterion, which may be specifically as follows:

$$R_s=Q_{meas,s}+Q_{hyst} \quad \text{formula 2}$$

$$R_n=Q_{meas,n}-Q_{offset} \quad \text{formula 3}$$

$R_s$ is a ranking value of the serving cell, which is referred to as an R value for short, and $R_n$ is an R value of a neighboring cell of the serving cell. $Q_{meas,s}$ is a received signal strength value (dBm) measured in the serving cell, namely, a measured RSRP value in the cell reselection process. $Q_{meas,n}$ is a received signal strength value (dBm) measured in the neighboring cell. $Q_{hyst}$ is a hysteresis value, used to avoid ping-pong reselection. $Q_{offset}$ is a cell offset, and if a frequency of the neighboring cell is the same as that of the serving cell, a value of $Q_{offset}$ is a cell offset $Q_{offsets,n}$ of the neighboring cell, or if a frequency of the neighboring cell is different from that of the serving cell, a value of $Q_{offset}$ is $Q_{offsets,n}+Q_{offsetfrequency}$, where $Q_{offsetfrequency}$ is a frequency offset.

The terminal device sorts all cells that meet the S criterion by the R value, and reselects to a cell having a maximum R value. $Q_{hyst}$, $Q_{offsets,n}$, and $Q_{offsetfeqency}$ are carried in a system message.

In the cell reselection process, for (3), a measurement result of the current cell is the R value, of the cell, calculated by the terminal device.

In conclusion, in the cell reselection process, the measurement result of the current cell is a value that is obtained by the terminal device and that is used to determine whether the terminal device can camp on the current cell.

It may be understood that in the embodiments of this application, the terminal device and/or a network device may perform some or all steps in the embodiments of this application. These steps or operations are merely examples. In the embodiments of this application, other operations or variations of various operations may be further performed. In addition, the steps may be performed in a sequence different from a sequence presented in the embodiments of this application, and not all the operations in the embodiments of this application may be performed.

FIG. 1 is a schematic diagram of a system architecture according to an embodiment of this application. As shown in FIG. 1, the system architecture includes a network device and a terminal device.

The following describes the communication method in this application by using specific embodiments.

Figure 2:
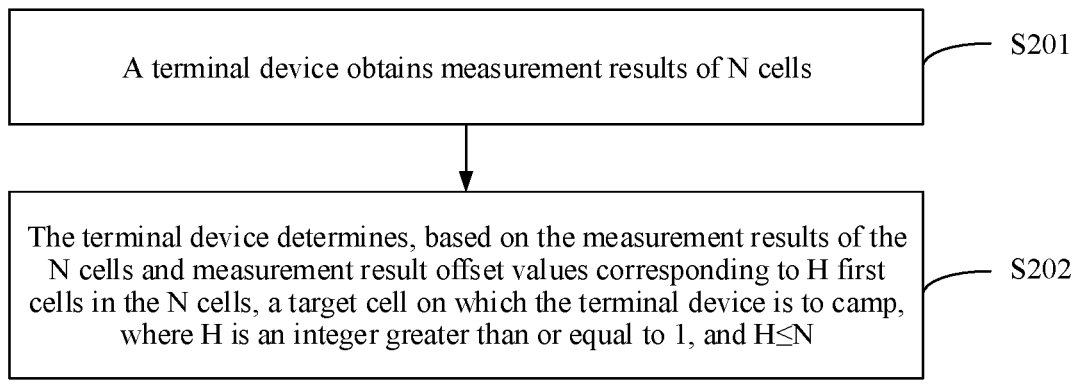
FIG. 2 is a first flowchart of a communication method according to an embodiment of this application.

FIG. 2 is a first flowchart of a communication method according to an embodiment of this application. Refer to FIG. 2. The method in this embodiment includes the following steps.

Step S201: A terminal device obtains measurement results of N cells.

Specifically, this embodiment may correspond to a cell selection process or a cell reselection process.

The N cells may be cells whose cell measurement results meet a quality condition in the cell selection process or the cell reselection process. The quality condition may be preset, or may be sent by a network device to the terminal device. The quality condition may be a quality threshold, or may be a quality formula. For example, in the cell reselection process, the N cells may be cells whose measurement results meet the S criterion, or the N cells may be cells whose measurement results are higher than a quality threshold. For example, the quality threshold may be $Thresh_{X,High}$ or $Thresh_{x,low}$.

Step S202: The terminal device determines, based on the measurement results of the N cells and measurement result offset values corresponding to H first cells in the N cells, a target cell on which the terminal device is to camp, where H is an integer greater than or equal to 1, and H≤N. The H first cells are cells corresponding to the measurement result offset values.

Specifically, in a manner, before step S202, the following a1 and a2 are further included:

a1: The terminal device determines a correspondence. In an implementation, the correspondence may be received by the terminal device from the network device. For example, the correspondence may be carried in a system message. In another implementation, the correspondence may be predefined in a protocol. For example, during cell selection, the terminal device may determine a corresponding measurement result offset value based on a correspondence predefined in a protocol. Optionally, the correspondence may include at least one of a correspondence between a cell and a measurement result offset value, a correspondence between a frequency channel number and a measurement result offset value, or a correspondence between a network and a measurement result offset value.

Specifically, the correspondence is at least one of the following:

(1) Correspondence Between a Cell and a Measurement Result Offset Value

Specifically, the correspondence between a cell and a measurement result offset value may be a correspondence between cell information and a measurement result offset value. The cell information includes at least one of a physical cell identifier (Physical Cell Identifier, PCI for short), a cell identifier cell ID, or a cell global identifier (Cell Global Identifier, CGI for short).

The terminal device may determine, based on the correspondence, a measurement result offset value corresponding to each cell. In an implementation, the correspondence may be a correspondence between L cells and L measurement result offset values. For example, the L cells are in a one-to-one correspondence with the L measurement result offset values, where L is an integer greater than or equal to 1. The L cells include a non-public network cell and/or a public network cell, and the L cells include the H first cells.

Specifically, for any one of the L cells, in the L cells, there is a cell whose measurement result offset value is the same as that corresponding to the cell, or there may be no cell whose measurement result offset value is the same as that corresponding to the cell, and this is not limited in this embodiment. That is, different cells correspond to different measurement result offset values, or different cells may correspond to a same measurement result offset value.

Optionally, the L cells are all non-public network cells.

Optionally, the L cells are all public network cells.

Optionally, the L cells include a public network cell and a non-public network cell.

(2) Correspondence Between a Frequency Channel Number and a Measurement Result Offset Value Specifically, the frequency channel number may include at least one of an absolute radio frequency channel number (absolute radio frequency channel number, NR-ARFCN for short) or a global synchronization channel number (global sync raster channel number, GSCN for short).

The terminal device may determine, based on the correspondence, a measurement result offset value corresponding to each frequency channel number. In an implementation, the correspondence may be a correspondence between K frequency channel numbers and K measurement result offset values. For example, the K frequency channel numbers are in a one-to-one correspondence with the K measurement result offset values, where K is an integer greater than or equal to 1. The K frequency channel numbers include a frequency channel number corresponding to a non-public network and/or a frequency channel number corresponding to a public network and/or a frequency channel number corresponding to both a non-public network and a public network, and cells corresponding to the K frequency channel numbers include H first cells.

Specifically, for any one of the K frequency channel numbers, in the K frequency channel numbers, there is a frequency channel number whose measurement result offset value is the same as that corresponding to the frequency channel number, or there may be no frequency channel number whose measurement result offset value is the same as that corresponding to the frequency channel number, and this is not limited in this embodiment. That is, different frequency channel numbers correspond to different measurement result offset values, or different frequency channel numbers may correspond to a same measurement result offset value.

The frequency channel number corresponding to a non-public network means that all cells corresponding to the frequency channel number are non-public network cells. The frequency channel number corresponding to a public network means that all cells corresponding to the frequency channel number are public network cells. The frequency channel number corresponding to both a non-public network and a public network means that cells corresponding to the frequency channel number include a public network cell and a non-public network cell.

It may be understood that, for the frequency channel number corresponding to both a non-public network and a public network, the frequency channel number may correspond to one measurement result offset value or may correspond to two measurement result offset values. When the frequency channel number corresponding to both a non-public network and a public network corresponds to two measurement result offset values, one measurement result offset value is an offset value of a non-public network cell corresponding to the frequency channel number, and the other measurement result offset value is an offset value of a public network cell corresponding to the frequency channel number. When the frequency channel number corresponding to both a non-public network and a public network corresponds to one measurement result offset value, an offset value of a non-public network cell corresponding to the frequency channel number is the same as a measurement result offset value of a public network cell corresponding to the frequency channel number; the measurement result offset value corresponding to the frequency channel number is a measurement result offset value corresponding to a non-public network cell corresponding to the frequency channel number, and a public network cell corresponding to the frequency channel number has no measurement result offset value; a measurement result offset value corresponding to a public network cell corresponding to the frequency channel number is 0; a measurement result offset value corresponding to a public network cell corresponding to the frequency channel number is an opposite number of the measurement result offset value corresponding to the frequency channel number; the measurement result offset value corresponding to the frequency channel number is a measurement result offset value corresponding to a public network cell corresponding to the frequency channel number, and a non-public network cell corresponding to the frequency channel number has no measurement result offset value; a measurement result offset value corresponding to a non-public network cell corresponding to the frequency channel number is 0; or a measurement result offset value corresponding to a non-public network cell corresponding to the frequency channel number is an opposite number of the measurement result offset value corresponding to the frequency channel number. This is not limited in this embodiment.

(3) Correspondence Between a Network and a Measurement Result Offset Value

Specifically, the correspondence between a network and a measurement result offset value may be a correspondence between a network identifier and a measurement result offset value.

The network identifier may include at least one of a closed access group identifier (closed access group identifier, CAG ID for short), an NPN ID, a public land mobile network identifier PLMN ID, a tracking area code (Tracking area code, TAC for short), or a radio access network area code (RAN Area code).

The terminal device may determine, based on the correspondence, the measurement result offset value corresponding to the network. In an implementation, the correspondence may be a correspondence between S networks and S measurement result offset values. For example, the S networks are in a one-to-one correspondence with the S measurement result offset values, where S is an integer greater than or equal to 1. The S networks include a non-public network and/or a public network, and cells corresponding to the S networks include H first cells.

Optionally, if the S networks are all non-public networks, the correspondence is a correspondence between S non-public networks and the S measurement result offset values, that is, a correspondence between identification information of the S non-public networks and the S measurement result offset values.

Optionally, if the S networks are all public networks, the correspondence is a correspondence between S public networks and the S measurement result offset values, that is, a correspondence between identification information of the S public networks and the S measurement result offset values.

Optionally, if the S networks include a public network and a non-public network, the correspondence is a correspondence between S1 non-public networks and S1 measurement result offset values and a correspondence between S2 public networks and S2 measurement result offset values. For example, the S1 non-public networks are in a one-to-one correspondence with the S1 measurement result offset values, and the S2 public networks are in a one-to-one correspondence with the S2 measurement result offset values. A sum of S1 and S2 is S, S1 is an integer greater than or equal to 1, and S2 is an integer greater than or equal to 1.

Similarly, for any one of the S networks, in the S networks, there may be a network whose measurement result offset value is the same as that corresponding to the network, or there may be no network whose measurement result offset value is the same as that corresponding to the network, and this is not limited in this embodiment. That is, different networks correspond to different measurement result offset values, or different networks may correspond to a same measurement result offset value.

When different networks correspond to different measurement result offset values, this may be specifically: Different non-public networks correspond to different measurement result offset values and/or different public networks correspond to different measurement result offset values.

When both the non-public network cell and the public network cell have corresponding measurement offset values, in one manner, the measurement offset value of the non-public network cell may be 0 or the measurement offset value of the public network cell may be 0.

a2: The terminal device determines, based on the correspondence, the measurement result offsets corresponding to the H first cells in the N cells.

Specifically, when the correspondence is (1), the terminal device may determine, based on information about cells in the N cells and the correspondence, whether information about a current cell in the N cells exists in the correspondence, and if the information about the current cell in the N cells exists in the correspondence, determine that a measurement result offset value corresponding to the information about the current cell in the correspondence is a measurement result offset value corresponding to the current cell. In this case, the current cell is a first cell.

When the correspondence is (2), the terminal device may determine, based on frequency channel numbers of cells in the N cells and the correspondence, whether a frequency channel number of a current cell in the N cells exists in the correspondence, and if the frequency channel number of the current cell in the N cells exists in the correspondence, determine that a measurement result offset value corresponding to the frequency channel number of the current cell is a measurement result offset value corresponding to the cell. In this case, the current cell is a first cell.

Optionally, the correspondence between a frequency channel number and a measurement result offset value may alternatively be applicable only to the non-public network cell, or applicable only to the public network cell. For example, in an implementation, when the correspondence between a frequency channel number and a measurement result offset value is applicable to only the non-public network cell, if the frequency channel number of the current cell corresponds to both the non-public network cell and the public network cell, the terminal device may learn, through a system message of the current cell, of an identity of a non-public network in which the current cell is located or an identity of a public network in which the cell is located, and determine whether the current cell is the non-public network cell or the public network cell. If the current cell is the non-public network cell, the terminal device may determine a measurement result offset value of the current cell based on the correspondence; if the current cell is the public network cell, the current cell has no measurement result offset value or a measurement result offset value of the current cell is 0 by default.

When the correspondence is (3), the terminal device may learn, through a system message of a cell, an identity of a non-public network of a current cell in the N cells or an identity of a public network of the cell, and further determine, based on the identity of the non-public network or the identity of the public network and the correspondence, whether the identity of the non-public network of the current cell or the identity of the public network of the cell exists in the correspondence. If the identity of the non-public network of the current cell or the identity of the public network of the cell exists in the correspondence, the terminal device determines that a measurement result offset value, corresponding to the identity of the non-public network of the current cell or the identity of the public network of the cell, in the correspondence, is a measurement result offset value corresponding to the current cell. In this case, the current cell is a first cell.

Therefore, the H first cells in the N cells are cells whose corresponding measurement result offset values can be obtained based on the correspondence. It may be understood that, when H is less than N, N—H cells in the N cells have no corresponding measurement offset value.

For example, the correspondence received by the terminal device from the network device is (1), and all the L cells are non-public network cells. If the N cells include M non-public network cells, M is an integer greater than or equal to 0, and the M non-public network cells may determine corresponding measurement result offset values based on the L cells in the correspondence (1), the H first cells are the M non-public network cells in the N cells. In this example, the M non-public network cells have the corresponding measurement result offset values, and N-M public network cells in the N cells do not have corresponding measurement result offset values.

For example, the correspondence received by the terminal device from the network device is (1), and the L cells include a non-public network cell and a public network cell. If the N cells include M non-public network cells and N-M public network cells, M is an integer greater than or equal to 0, and the N cells may determine corresponding measurement result offset values based on the correspondence (1), the H first cells are the N cells, where H=N. In this example, each of the N cells has a corresponding measurement result offset value.

The terminal device may determine, based on the measurement results of the N cells and the measurement result offset values corresponding to the H first cells in the N cells, a target cell on which the terminal device is to camp, where H is an integer greater than or equal to 1, and H≤N.

Specifically, for one first non-public network cell in the H first cells, when the terminal device is a terminal device that supports at least a non-public network (where the terminal device that supports at least a non-public network is a terminal device that supports only a non-public network or a terminal device that supports both a non-public network and a public network) and a first measurement result offset value corresponding to the first non-public network cell is a positive value, the terminal device adds the first measurement result offset value to a first measurement result of the first non-public network cell, to obtain an updated first measurement result. The terminal device determines, based on updated first measurement results, the target cell on which the terminal device is to camp.

The cell selection process is used as an example, and the first measurement result may be a $S_{rxlev}$ value of the first non-public network cell, and the first measurement result offset value is $Q_{offsetmpntemp}$. Specifically, in a search process, the terminal device reads a system message of the first non-public network cell, obtains parameters such as $Q_{rxlevmeas}$, $Q_{rxlevmin}$, and $Q_{rxlevminoffset}$, and obtains an updated first measurement result $S_{rxlev1}$ according to a formula 4:

$$S_{rxlev1} = S_{rlev} + \text{delta}Q = Q_{rxlevmeas} - (Q_{rxlevmin} + Q_{rxlevminoffset}) - P_{compensation} + Q_{offsetmpntemp} \quad \text{formula 4}$$

In this embodiment, the cell selection formula 4 is used as an example. The updated first measurement result of the first non-public network cell may alternatively be determined according to another variant formula of the cell selection formula 4.

Similarly, the cell reselection process is used as an example. The first measurement result may be an R value of the first non-public network cell, and the first measurement result offset value is $Q_{offsetmpntemp}$. Specifically, when the first non-public network cell is a serving cell of the terminal device, the terminal device reads system information of the first non-public network cell to obtain $Q_{hyst}$, and obtains an updated first measurement result R1 according to a formula 5. When the first non-public network cell is a neighboring cell of the serving cell of the terminal device, the terminal device reads system information of the first non-public network cell to obtain $Q_{offset}$, and obtains an updated first measurement result R1 according to a formula 6:

$$R_s = Q_{meas,s} + Q_{hyst} + Q_{offsetmpntemp}$$ formula 5

$$R_n = Q_{meas,n} - Q_{offset} + Q_{offsetmpntemp}$$ formula 6

In this embodiment, the cell reselection formula 5 and formula 6 are used as an example, and the updated first measurement result of the first non-public network cell may alternatively be determined according to another variant formula of the cell reselection formula 5 and formula 6.

For one first non-public network cell in the H first cells, when the terminal device is a terminal device that supports at least a non-public network and a first measurement result offset value corresponding to the first non-public network cell is a negative value, the terminal device subtracts the first measurement result offset value from a first measurement result of the first non-public network cell, to obtain an updated first measurement result. The terminal device determines, based on updated first measurement results, the target cell on which the terminal device is to camp.

For one first non-public network cell in the H first cells, when the terminal device is a terminal device that supports only a public network and a first measurement result offset value corresponding to the first non-public network cell is a positive value, the terminal device subtracts the first measurement result offset value from a first measurement result of the first non-public network cell, to obtain an updated first measurement result. The terminal device determines, based on updated first measurement results, the target cell on which the terminal device is to camp.

For one first non-public network cell in the H first cells, when the terminal device is a terminal device that supports only a public network and a first measurement result offset value corresponding to the first non-public network cell is a negative value, the terminal device adds the first measurement result offset value to a first measurement result of the first non-public network cell, to obtain an updated first measurement result. The terminal device determines, based on updated first measurement results, the target cell on which the terminal device is to camp.

For one first non-public network cell in the H first cells, when the terminal device is a terminal device that supports both a non-public network and a public network and a first measurement result offset value corresponding to the first non-public network cell is a positive value, the terminal device subtracts the first measurement result offset value from a first measurement result of the first non-public network cell, to obtain an updated first measurement result. The terminal device determines, based on updated first measurement results, the target cell on which the terminal device is to camp.

For one first non-public network cell in the H first cells, when the terminal device is a terminal device that supports both a non-public network and a public network and a first measurement result offset value corresponding to the first non-public network cell is a negative value, the terminal device adds the first measurement result offset value to a first measurement result of the first non-public network cell, to obtain an updated first measurement result. The terminal device determines, based on updated first measurement results, the target cell on which the terminal device is to camp.

For one first public network cell in the H first cells, when the terminal device is a terminal device that supports both a non-public network and a public network and a first measurement result offset value corresponding to the first public network cell is a positive value, the terminal device adds the first measurement result offset value to a first measurement result of the first public network cell, to obtain an updated first measurement result. The terminal device determines, based on updated first measurement results, the target cell on which the terminal device is to camp.

For one first public network cell in the H first cells, when the terminal device is a terminal device that supports both a non-public network and a public network and a second measurement result offset value corresponding to the first public network cell is a negative value, the terminal device subtracts the second measurement result offset value from a second measurement result of the first public network cell, to obtain an updated second measurement result. The terminal device determines, based on updated second measurement results, the target cell on which the terminal device is to camp.

For one first public network cell in the H first cells, when the terminal device is a terminal device that supports at least a non-public network and a second measurement result offset value corresponding to the first public network cell is a positive value, the terminal device subtracts the second measurement result offset value from a second measurement result of the first public network cell, to obtain an updated second measurement result. The terminal device determines, based on updated second measurement results, the target cell on which the terminal device is to camp.

For one first public network cell in the H first cells, when the terminal device is a terminal device that supports at least a non-public network and a second measurement result offset value corresponding to the first public network cell is a negative value, the terminal device adds the second measurement result offset value to a second measurement result of the first public network cell, to obtain an updated second measurement result. The terminal device determines, based on updated second measurement results, the target cell on which the terminal device is to camp.

For one first public network cell in the H first cells, when the terminal device is a terminal device that supports only a public network and a second measurement result offset value corresponding to the first public network cell is a positive value, the terminal device adds the second measurement result offset value to a second measurement result of the first public network cell, to obtain an updated second measurement result. The terminal device determines, based on updated second measurement results, the target cell on which the terminal device is to camp.

For one first public network cell in the H first cells, when the terminal device is a terminal device that supports only a public network and a second measurement result offset value corresponding to the first public network cell is a negative value, the terminal device subtracts the second measurement result offset value from a second measurement result of the first public network cell, to obtain an updated second measurement result. The terminal device determines, based on updated second measurement results, the target cell on which the terminal device is to camp.

It may be understood that for one second cell in the N—H cells in the N cells, the second cell has no corresponding measurement result offset value, and a measurement result of the second cell is not updated. Clearly, in the cell selection process, the measurement result of the second cell may be obtained according to the formula 1 (or a variation of the formula 1), and in the cell reselection process, the measurement result of the second cell may be obtained according to the formula 1 (or a variation of the formula 1) or the measurement result of the second cell may be obtained according to the formula 2 (or a variation of the formula 2) or the formula 3 (or a variation of the formula 3).

A person skilled in the art should understand that, in the cell selection process, for a method for determining, based on measurement results of cells or updated measurement results, a cell to be camped on, refer to the S criterion for cell selection in the conventional technology. In the cell reselection process, for a method for determining, based on measurement results of cells or updated measurement results, a cell to be camped on, refer to the reselection criterion for cell reselection in the conventional technology.

In conclusion, in this solution, when the terminal device is a terminal device that supports at least a non-public network, introducing the measurement result offset value can optimize a measurement result of the non-public network cell or the public network cell, so that the terminal device is more likely to camp on the non-public network cell, thereby improving efficiency of determining, by the terminal device, a cell on which the terminal device is to camp. Generally, because of less competition in the non-public network, a terminal device that supports both the non-public network and the public network has a faster communication speed in the non-public network. The method in this solution can further enable the terminal device that supports both the non-public network and the public network to be more likely to camp on the public network cell. Because a deployment range of the public network cell is wider, when the terminal device that supports both the non-public network and the public network camps on the public network cell, that the terminal device camps on the public network can be more likely to ensure service continuity.

In this solution, when the terminal device is a terminal device that supports only a public network, introducing the measurement result offset value can optimize a measurement result of the non-public network cell or the public network cell, so that the terminal device is more likely to camp on the public network cell, thereby improving efficiency of determining, by the terminal device, a cell on which the terminal device is to camp.

In this embodiment, the terminal device obtains the measurement results of the N cells, and determines, based on the measurement results of the N cells and the measurement result offset values corresponding to the H first cells in the N cells, the target cell on which the terminal device is to camp, to improve efficiency of determining, by the terminal device, a cell on which the terminal device is to camp.

Figure 3:
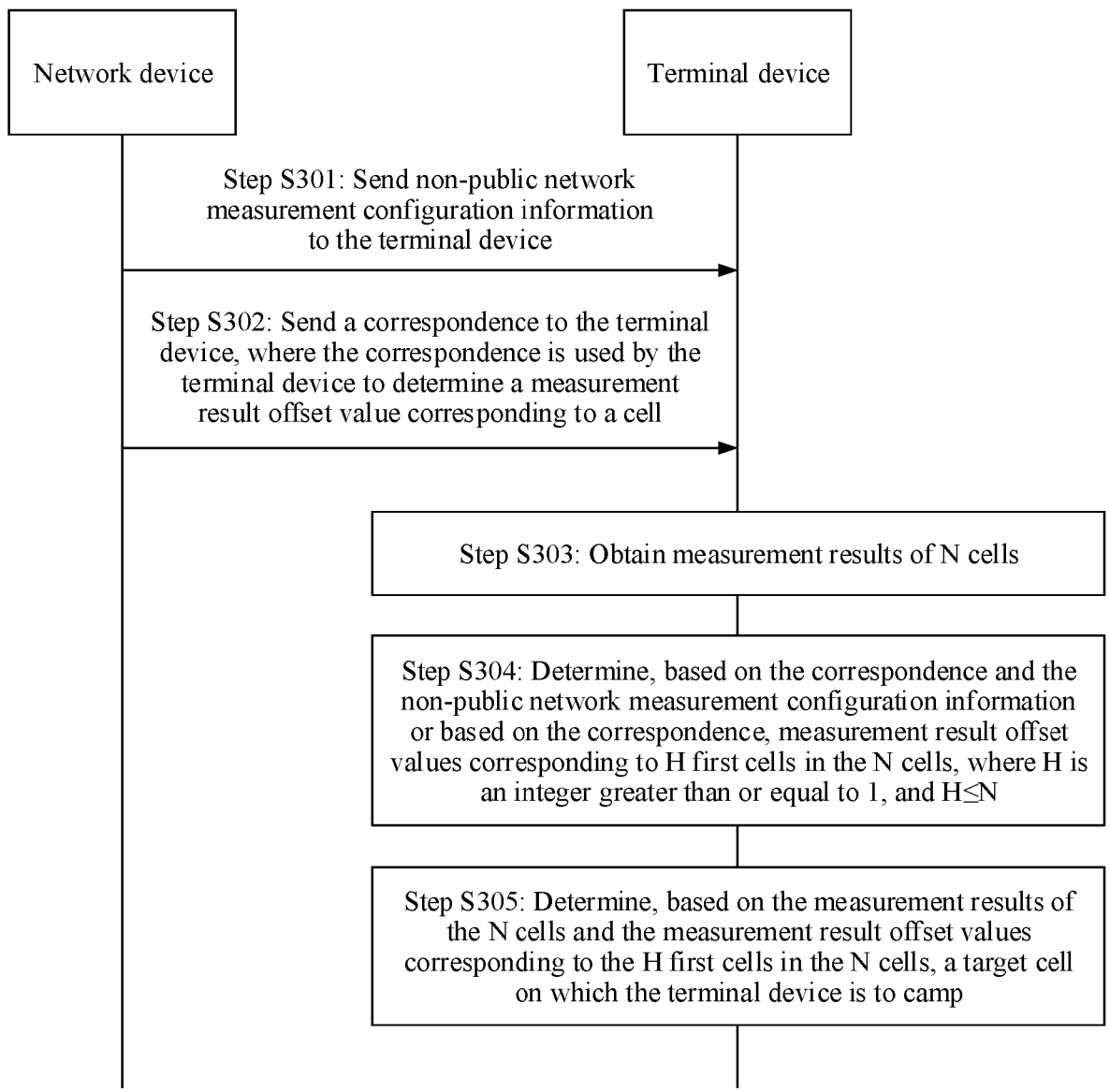
FIG. 3 is a first signaling interworking diagram of a communication method according to an embodiment of this application.

To further improve efficiency of determining, by the terminal device, a cell on which the terminal device is to camp, FIG. 3 is a first signaling interaction diagram of a communication method according to an embodiment of this application. Refer to FIG. 3. The method in this embodiment includes the following steps.

Step S301: A network device sends non-public network measurement configuration information to a terminal device.

The non-public network measurement configuration information includes first information, second information, third information, fourth information, or fifth information, where the first information includes identification information of a non-public network and frequency channel number information corresponding to the non-public network, the second information includes identification information of a non-public network and non-public network cell information corresponding to the non-public network, the third information includes frequency channel number information corresponding to a non-public network and non-public network cell information corresponding to a frequency channel number corresponding to the non-public network, the fourth information includes non-public network cell information, and the fifth information includes frequency channel number information corresponding to a non-public network.

The non-public network measurement configuration information may further include identification information of a non-public network, frequency channel number information corresponding to the non-public network, and non-public network cell information corresponding to a frequency channel number corresponding to the non-public network.

Specifically, the non-public network cell information includes at least one of the following: a PCI, a cell identifier cell ID, or a CGI.

The non-public network measurement configuration information may further include first indication information, and the first indication information is used to indicate a manner in which a non-public network cell supports a non-public network service. The manner in which the non-public network cell supports the non-public network service is directly supporting the non-public network service or indirectly supporting the non-public network service. Optionally, the indirectly supporting the non-public network service may be a mechanism of supporting the non-public network service through a non-3GPP interworking function (non-3GPP inter working function, N3IWF) interface. For example, a public network does not support a direct non-public network service, but the non-public network service can be transparently transmitted in the public network and then sent to the non-public network through the N3IWF interface.

Optionally, the network device further sends second indication information to the terminal device, where the second indication information is used to indicate cell priority information. The cell priority information is: at least one of a priority of a cell directly supporting the non-public network service, a priority of a cell indirectly supporting the non-public network service, or a priority of a public network cell. A terminal device that supports a non-public network may determine a cell priority of the non-public network based on the cell priority information. For example, the priority of the cell directly supporting the non-public network service is higher than the priority of the cell indirectly supporting the non-public network service, and both the priority of the cell directly supporting the non-public network service and the priority of the cell indirectly supporting the non-public network service are higher than the priority of the public network cell.

Step S302: The network device sends a correspondence to the terminal device, where the correspondence is used by the terminal device to determine a measurement result offset value corresponding to a cell.

Alternatively, the terminal device may determine the correspondence based on a correspondence predefined in a protocol.

Specifically, the correspondence in this embodiment is the same as the correspondence in the embodiment shown in FIG. 2, and details are not described herein again.

Step S303: The terminal device obtains measurement results of N cells.

Specifically, when the terminal device is a terminal device that supports at least a non-public network, in one manner, the terminal device may determine, based on the non-public network measurement configuration information, a cell to be measured in non-public network cells or cells corresponding to a frequency channel number of the non-public network that are indicated by the non-public network measurement configuration information, and obtain the measurement results of the N cells. That is, the N cells may be the non-public network cells or the cells corresponding to the frequency channel number of the non-public network that are indicated by the non-public network measurement configuration information. This manner narrows a range of cell selection or cell reselection, and therefore can further improve efficiency of determining, by the terminal, a target cell on which the terminal is to camp.

When the terminal device is a terminal device that supports at least a non-public network, in another manner, the terminal device may determine, based on the non-public network measurement configuration information and a target non-public network supported by the terminal device, a cell to be measured in cells that are non-public network cells indicated by the non-public network measurement configuration information and that are cells in the target non-public network supported by the terminal device, or determine a cell to be measured in cells that are cells corresponding to a frequency channel number of the non-public network and that are cells in the target non-public network supported by the terminal device, and obtain the measurement results of the N cells. In other words, the N cells may be the cells that are the non-public network cells indicated by the non-public network measurement configuration information and that are the cells in the target non-public network supported by the terminal device, or the N cells may be the cells that are the cells corresponding to the frequency channel number of the non-public network and that are the cells in the target non-public network supported by the terminal device. This manner further narrows the range of cell selection or cell reselection, and therefore can further improve the efficiency of determining, by the terminal, a target cell on which the terminal is to camp.

When the terminal device is a terminal device that supports only a public network, the terminal device may determine, based on the non-public network measurement configuration information, a cell to be measured in cells other than non-public network cells indicated by the non-public network measurement configuration information or in cells other than cells in a frequency channel number corresponding to the non-public network that are indicated by the non-public network measurement configuration information, and obtain the measurement results of the N cells. That is, the N cells may be the cells other than the non-public network cells indicated by the non-public network measurement configuration information or the cells other than the cells corresponding to the frequency channel number of the non-public network that are indicated by the non-public network measurement configuration information. This manner narrows a range of cell selection or cell reselection, and therefore can further improve the efficiency of determining, by the terminal, a target cell on which the terminal is to camp.

In another manner, regardless of whether the terminal device supports a non-public network or a public network, the terminal device may not consider the non-public network measurement configuration information, but determine a cell to be measured in all cells that can be measured, and obtain the measurement results of the N cells.

Further, if the non-public network measurement configuration information further includes the first indication information, and the terminal device further receives the second indication information from the network device, the terminal may obtain measurement results of cells in a cell priority order based on cell priorities indicated by the second indication information, until a target cell on which the terminal can camp is obtained. In the cell reselection process, the target cell that can be camped on is determined with reference to the foregoing measurement criterion and the cell priorities indicated by the second indication information.

Step S304: The terminal device determines, based on the correspondence and the non-public network measurement configuration information, or the terminal device determines, based on the correspondence, measurement result offset values corresponding to H first cells in the N cells, where H is an integer greater than or equal to 1, and H≤N.

Specifically, when the correspondence is (3) in a1 in the embodiment shown in FIG. 2, and the non-public network measurement configuration information is the identification information of the non-public network and the frequency channel number information corresponding to the non-public network, or the non-public network measurement configuration information is the identification information of the non-public network and the non-public network cell information corresponding to the non-public network, if a frequency channel number of the current cell or information (at least one of the PCI, the cell ID, or the CGI) of the current cell that is being measured in the N cells exists in the non-public network measurement configuration information, when determining whether the current cell corresponds to a measurement result offset value and determining the measurement result offset value of the current cell, the terminal device does not need to read and parse a system message of the current cell that is being measured to obtain an identity of the non-public network of the current cell, and may determine that an identity of the non-public network corresponding to the frequency channel number of the current cell or the information of the current cell in the non-public network measurement configuration information is the identity of the non-public network of the current cell. Therefore, the efficiency of determining, by the terminal, a target cell on which the terminal is to camp can be further improved.

When the correspondence is (2) in a1 in the embodiment shown in FIG. 2 and a first frequency channel number corresponding to both a non-public network and a public network exists in the K frequency channel numbers, where the first frequency channel number corresponds to two measurement result offset values, and the non-public network measurement configuration information is the frequency channel number information corresponding to the non-public network and the non-public network cell information corresponding to the frequency channel number of the non-public network, if information of the current cell exists in the non-public network measurement configuration information, it may be determined that the current cell is a non-public network cell. When whether the current cell corresponds to a measurement result offset value is determined and the measurement result offset value of the current cell is determined, it does not need to read and parse a system message of the current cell that is being measured to obtain whether the current cell is a non-public network cell or a public network cell. Therefore, the efficiency of determining, by the terminal, a target cell on which the terminal is to camp can be further improved.

When the correspondence is (2) in a1 in the embodiment shown in FIG. 2 and a first frequency channel number corresponding to both a non-public network and a public network exists in the K frequency channel numbers, where the first frequency channel number corresponds to one measurement result offset value and measurement result offset values corresponding to a non-public network cell and a public network cell that correspond to the first frequency channel number are the same, and the non-public network measurement configuration information is the frequency channel number information corresponding to the non-public network and the non-public network cell information corresponding to the frequency channel number of the non-public network, if information of the current cell exists in the non-public network measurement configuration information, it may be determined that the current cell is a non-public network cell. When whether the current cell corresponds to a measurement result offset value is determined and the measurement result offset value of the current cell is determined, it is unnecessary to read and parse a system message of the current cell that is being measured to obtain whether the current cell is a non-public network cell or a public network cell. Therefore, the efficiency of determining, by the terminal, a target cell on which the terminal is to camp can be further improved.

When the correspondence is (1) in a1 in the embodiment shown in FIG. 2, the terminal device may determine, based on the correspondence and an identifier of the current cell, whether the current cell has a corresponding measurement result offset value, and if the current cell has a corresponding measurement result offset value, determine the measurement result offset value corresponding to the current cell.

When the correspondence is (2) in a1 in the embodiment shown in FIG. 2 and a first frequency channel number corresponding to both a non-public network and a public network does not exist in the K frequency channel numbers, or when the correspondence is (2) in a1 in the embodiment shown in FIG. 2 and a first frequency channel number corresponding to both a non-public network and a public network exists in the K frequency channel numbers, where the first frequency channel number corresponds to one measurement result offset value and measurement result offset values corresponding to a non-public network cell and a public network cell that correspond to the first frequency channel number are the same, the terminal device may determine, based on the correspondence and a frequency channel number of the current cell, whether the current cell has a corresponding measurement result offset value, and if the current cell has a corresponding measurement result offset value, determine the measurement result offset value corresponding to the current cell.

Step S305: The terminal device determines, based on the measurement results of the N cells and the measurement result offset values corresponding to the H first cells in the N cells, a target cell on which the terminal device is to camp.

Specifically, for specific implementation of this step, refer to step S202 in the foregoing embodiment. Details are not described again in this embodiment.

In this embodiment, the terminal device receives, from the network device, the non-public network measurement configuration information and the correspondence used to obtain the measurement result offset value, to further improve the efficiency of determining, by the terminal, a target cell on which the terminal is to camp.

Figure 4:
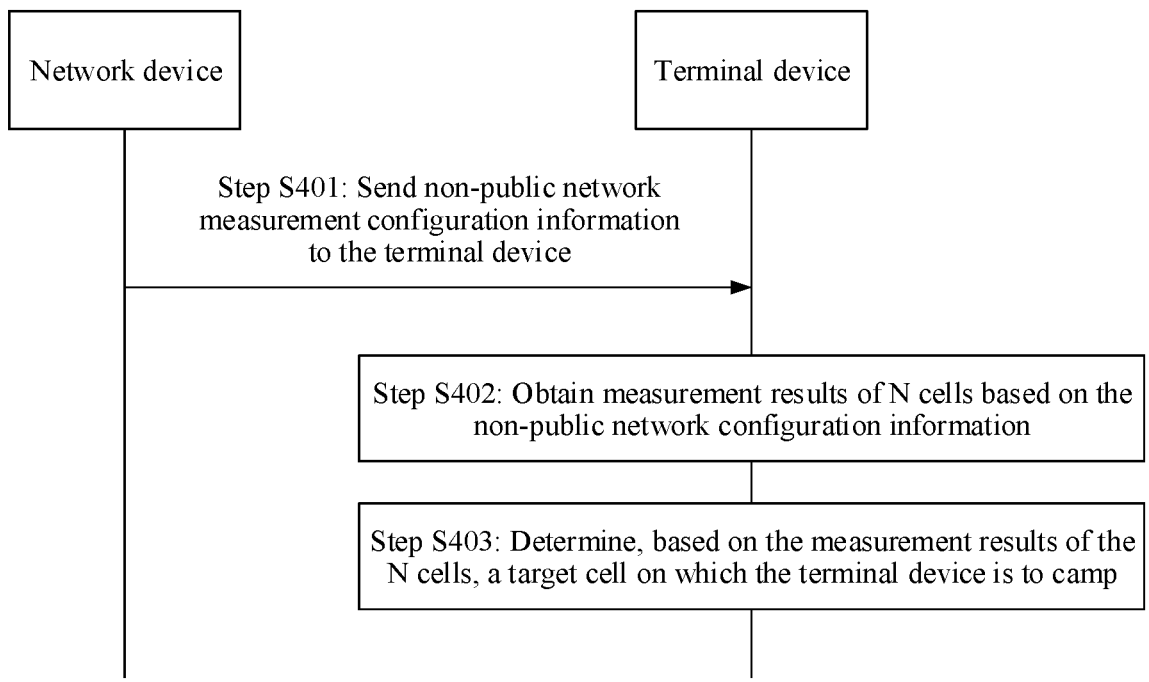
FIG. 4 is a second signaling interworking diagram of a communication method according to an embodiment of this application.

The following describes another communication method provided in this application by using a specific embodiment. FIG. 4 is a second interaction diagram of a method according to an embodiment of this application. Refer to FIG. 4. The method in this embodiment includes the following steps.

Step S401: A network device sends non-public network measurement configuration information to a terminal device.

Specifically, for specific implementation of this embodiment, refer to descriptions in the embodiment shown in FIG. 3. Details are not described in this embodiment.

Step S402: The terminal device obtains measurement results of N cells based on the non-public network measurement configuration information.

Specifically, when the terminal device is a terminal device that supports at least a non-public network, in one manner, the terminal device may determine, based on the non-public network measurement configuration information, a cell to be measured in non-public network cells or cells corresponding to a frequency channel number of the non-public network that are indicated by the non-public network measurement configuration information, and obtain the measurement results of the N cells. That is, the N cells may be the non-public network cells or the cells corresponding to the frequency channel number of the non-public network that are indicated by the non-public network measurement configuration information. This manner narrows a range of cell selection or cell reselection, and therefore can improve efficiency of determining, by the terminal, a target cell on which the terminal is to camp.

When the terminal device is a terminal device that supports at least a non-public network, in another manner, the terminal device may determine, based on the non-public network measurement configuration information and a target non-public network supported by the terminal device, a cell to be measured in cells that are non-public network cells indicated by the non-public network measurement configuration information and that are cells in the target non-public network supported by the terminal device, or determine a cell to be measured in cells that are cells corresponding to a frequency channel number of the non-public network and that are cells in the target non-public network supported by the terminal device, and obtain the measurement results of the N cells. In other words, the N cells may be the cells that are the non-public network cells indicated by the non-public network measurement configuration information and that are the cells in the target non-public network supported by the terminal device, or the N cells may be the cells that are the cells corresponding to the frequency channel number of the non-public network and that are the cells in the target non-public network supported by the terminal device. This manner further narrows the range of cell selection or cell reselection, and therefore can further improve the efficiency of determining, by the terminal, a target cell on which the terminal is to camp.

When the terminal device is a terminal device that supports only a public network, the terminal device may determine, based on the non-public network measurement configuration information, a cell to be measured in cells other than non-public network cells indicated by the non-public network measurement configuration information or in cells other than cells in a frequency channel number corresponding to the non-public network that are indicated by the non-public network measurement configuration information, and obtain the measurement results of the N cells. That is, the N cells may be the cells other than the non-public network cells indicated by the non-public network measurement configuration information or the cells other than the cells corresponding to the frequency channel number of the non-public network that are indicated by the non-public network measurement configuration information. This manner narrows a range of cell selection or cell reselection, and therefore can improve the efficiency of determining, by the terminal, a target cell on which the terminal is to camp.

For other specific implementations of step S402, refer to descriptions in the embodiment shown in FIG. 3. Details are not described in this embodiment.

Step S403: The terminal device determines, based on the measurement results of the N cells, a target cell on which the terminal device is to camp.

Specifically, in a cell selection process, for a method for determining, based on measurement results of cells, a cell to be camped on, refer to the S criterion for cell selection in the conventional technology. In a cell reselection process, for a method for determining, based on measurement results of cells, a cell to be camped on, refer to the reselection criterion for cell reselection in the conventional technology.

In this embodiment, the terminal device receives the non-public network measurement configuration information from the network device, to improve the efficiency of determining, by the terminal, a target cell on which the terminal is to camp.

The foregoing describes the communication method provided in the embodiments of this application. The following describes a communication apparatus provided in the embodiments of this application.

Figure 5:
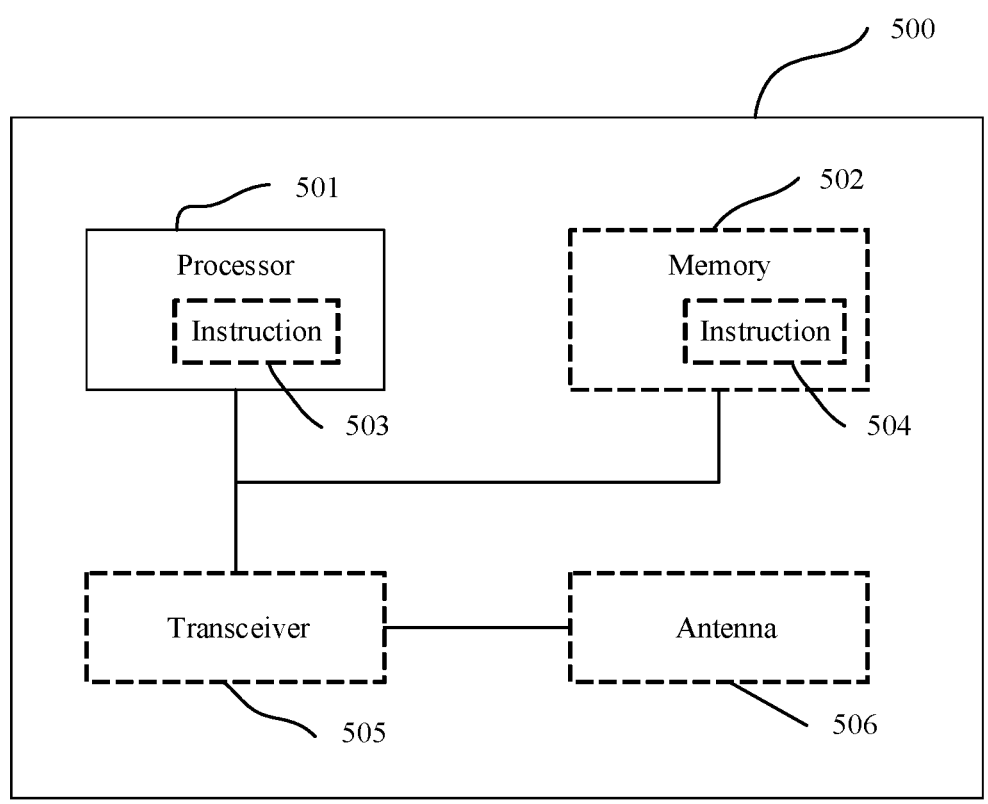
FIG. 5 is a schematic structural diagram of a communication apparatus according to an embodiment of this application.

FIG. 5 is a schematic structural diagram of a communication apparatus according to an embodiment of this application. As shown in FIG. 5, the communication apparatus 500 in this embodiment may be the terminal device (or a component that can be used in the terminal device) or the network device (or a component that can be used in the network device) mentioned in the foregoing method embodiments. The communication apparatus may be configured to implement a method that corresponds to the terminal device or the network device and that is described in the foregoing method embodiments. For details, refer to the descriptions in the foregoing method embodiments.

The communication apparatus 500 may include one or more processors 501. The processor 501 may also be referred to as a processing unit or a processing module, and may implement a specific control or processing function. The processor 501 may be a general-purpose processor, a dedicated processor, or the like. For example, the processor 501 may be a baseband processor or a central processing unit. The baseband processor may be configured to process a communication protocol and communication data. The central processing unit may be configured to control the communication apparatus, execute a software program, and process data of the software program.

In an optional design, the processor 501 may also store an instruction 503 or data (for example, intermediate data). The instruction 503 may be run by the processor, to enable the communication apparatus 500 to perform the method that corresponds to the terminal device or the network device and that is described in the foregoing method embodiments.

In another possible design, the communication apparatus 500 may include a circuit, and the circuit may implement the sending, receiving, or communication function in the foregoing method embodiments.

Optionally, the communication apparatus 500 may include one or more memories 502. The memory may store an instruction 504, and the instruction may be run on the processor, to enable the communication apparatus 500 to perform the method described in the foregoing embodiments.

Optionally, the memory may alternatively store data. The processor and the memory may be separately disposed, or may be integrated together.

Optionally, the communication apparatus 500 may further include a transceiver 505 and/or an antenna 506. The processor 501 may be referred to as a processing unit or a processing module, and controls the communication apparatus (a terminal device or a network device). The transceiver 505 may be referred to as a transceiver unit, a transceiver machine, a transceiver circuit, a transceiver, or the like, and is configured to implement a transceiver function of the communication apparatus.

For specific implementation processes of the transceiver 505 and the processor 501, refer to related descriptions in the foregoing embodiments. Details are not described herein again.

The processor 501 and the transceiver 505 that are described in this application may be implemented on an integrated circuit (integrated circuit, IC), an analog IC, a radio frequency integrated circuit (radio frequency integrated circuit, RFIC), a mixed signal IC, an application-specific integrated circuit (application specific integrated circuit, ASIC), a printed circuit board (printed circuit board, PCB), an electronic device, or the like. The processor and the transceiver may alternatively be manufactured by using various IC technologies, for example, a complementary metal oxide semiconductor (complementary metal oxide semiconductor, CMOS), an N-channel metal oxide semiconductor (nMetal-oxide-semiconductor, NMOS), a p-channel metal oxide semiconductor (positive channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

In the descriptions of the foregoing embodiments, the communication apparatus 500 is described by using the terminal device or the network device as an example, but the communication apparatus described in this application is not limited to the terminal device or the network device, and a structure of the communication apparatus may not be limited by FIG. 5. The communication apparatus 500 may be an independent device or may be a part of a relatively large device. For example, the device may be:

(1) an independent integrated circuit IC, a chip, or a chip system or subsystem;
(2) a set including one or more ICs, where optionally, the IC set may further include a storage component configured to store data and/or instructions;
(3) an ASIC, for example, a modem (MSM);
(4) a module that can be embedded in another device;
(5) a receiver, a terminal device, a cellular phone, a wireless device, a hand-held phone, a mobile unit, or a network device; or
(6) another device, or the like.

Figure 6:
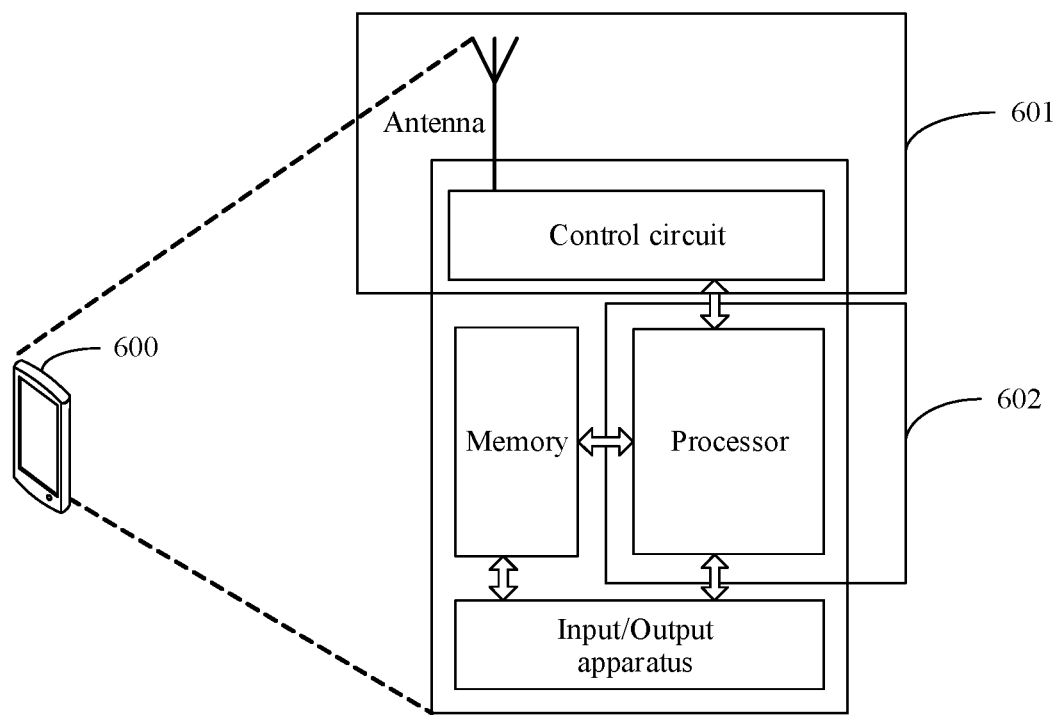
FIG. 6 is a schematic structural diagram of a terminal device according to an embodiment of this application.

FIG. 6 is a schematic structural diagram of a terminal device according to an embodiment of this application. The terminal device is applicable to the terminal device described in the foregoing embodiments of this application. For ease of description, FIG. 6 shows only main components of the terminal device. As shown in FIG. 6, the terminal device 600 includes a processor, a memory, a control circuit, an antenna, and an input/output apparatus. The processor is mainly configured to: process a communication protocol and communication data, control the entire terminal device, execute a software program, and process data of the software program. The memory is configured to store the software program and data. A radio frequency circuit is mainly configured to perform conversion between a baseband signal and a radio frequency signal, and process the radio frequency signal. The antenna is mainly configured to send and receive a radio frequency signal in an electromagnetic wave form. The input/output apparatus, for example, a touchscreen, a display screen, or a keyboard, is mainly configured to receive data entered by a user and output data to the user.

After the terminal device is powered on, the processor may read the software program in a storage unit, explain and execute instructions of the software program, and process the data of the software program. When data needs to be sent in a wireless manner, after performing baseband processing on the to-be-sent data, the processor outputs a baseband signal to the radio frequency circuit. After performing radio frequency processing on the baseband signal, the radio frequency circuit sends a radio frequency signal in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 6 shows only one memory and one processor. An actual terminal device may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 6 integrates functions of the baseband processor and the central processing unit. A person skilled in the art may understand that the baseband processor and the central processing unit may be processors independent of each other, and are interconnected by using technologies such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of software program. The processor executes the software program to implement a baseband processing function.

Figure 7:
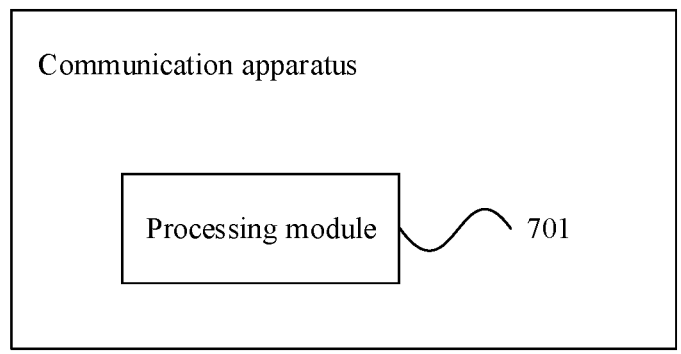
FIG. 7 is a schematic structural diagram of a communication apparatus according to another embodiment of this application.

FIG. 7 is a schematic structural diagram of a communication apparatus according to another embodiment of this application. Refer to FIG. 7. The communication apparatus in this embodiment includes:
  a processing module 701, configured to obtain measurement results of N cells, where the N cells include M non-public network cells, where N is an integer greater than or equal to 1, and M is an integer greater than or equal to 0.

The processing module 701 is further configured to determine, based on the measurement results of the N cells and measurement result offset values corresponding to H first cells in the N cells, a target cell on which the communication apparatus is to camp, where H is an integer greater than or equal to 1, and H≤N.

For the measurement result offset values, different cells correspond to different measurement result offset values; different frequency channel numbers correspond to different measurement result offset values; or different non-public networks correspond to different measurement result offset values and/or different public networks correspond to different measurement result offset values.

Optionally, in an embodiment, a measurement result offset value corresponding to a public network cell is 0 or a measurement result offset value corresponding to the non-public network cell is 0.

The communication apparatus in this embodiment may be configured to execute the technical solutions corresponding to the terminal device in the method embodiments shown in FIG. 2 to FIG. 4. Implementation principles and technical effects thereof are similar, and details are not described herein again.

Figure 8:
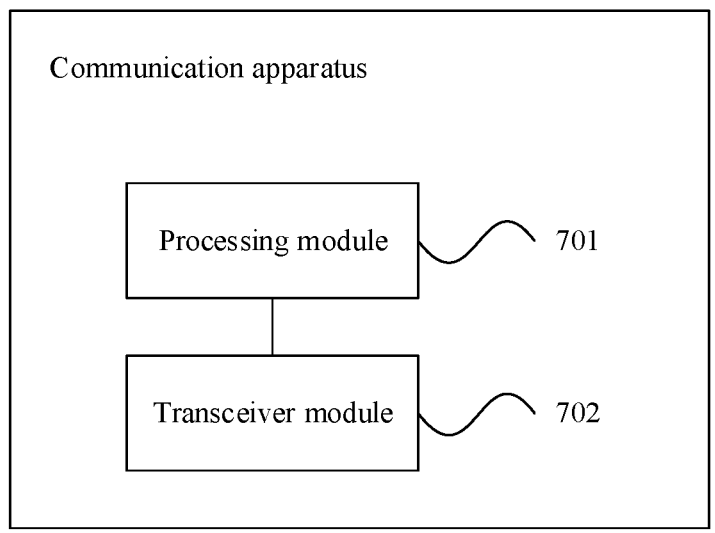
FIG. 8 is a schematic structural diagram of a communication apparatus according to another embodiment of this application.

FIG. 8 is a schematic structural diagram of a communication apparatus according to another embodiment of this application. Refer to FIG. 8. Based on the apparatus shown in FIG. 7, the communication apparatus in this embodiment further includes a transceiver module 702.

The transceiver module 702 is configured to receive a correspondence from a network device.

The processing module 701 is specifically configured to determine, based on the correspondence, the measurement result offset values corresponding to the H first cells in the N cells.

The correspondence is any one of the following:
  a correspondence between L cells and L measurement result offset values, where the L cells are in a one-to-one correspondence with the L measurement result offset values, where L is an integer greater than or equal to 1, the L cells include a non-public network cell and/or a public network cell, and the L cells include the H first cells;
  a correspondence between K frequency channel numbers and K measurement result offset values, where the K frequency channel numbers are in a one-to-one correspondence with the K measurement result offset values, where K is an integer greater than or equal to 1, the K frequency channel numbers include a frequency channel number corresponding to a non-public network and/or a frequency channel number corresponding to a public network and/or a frequency channel number corresponding to both a non-public network and a public network, and cells corresponding to the K frequency channel numbers include the H first cells; and
  a correspondence between S networks and S measurement result offset values, where the S networks are in a one-to-one correspondence with the S measurement result offset values, where S is an integer greater than or equal to 1, the S networks include a non-public network and/or a public network, and cells corresponding to the S networks include the H first cells.

Optionally, in an embodiment, the transceiver module 702 is further configured to receive non-public network measurement configuration information from the network device, where the non-public network measurement configuration information is used by the communication apparatus to determine the measurement result offset values corresponding to the H first cells in the N cells and/or is used by the communication apparatus to determine a cell to be measured.

The non-public network measurement configuration information includes first information, second information, third information, fourth information, or fifth information, where the first information includes identification information of a non-public network and frequency channel number information corresponding to the non-public network, the second information includes identification information of a non-public network and non-public network cell information corresponding to the non-public network, the third information includes frequency channel number information corresponding to a non-public network and non-public network cell information corresponding to a frequency channel number corresponding to the non-public network, the fourth information includes non-public network cell information, and the fifth information includes frequency channel number information corresponding to a non-public network.

The non-public network cell information includes at least one of the following: a physical cell identifier PCI of the non-public network cell, a cell identifier cell ID, or a cell global identifier CGI.

Further, the non-public network measurement configuration information further includes first indication information, and the first indication information is used to indicate a manner in which the non-public network cell supports a non-public network service.

Optionally, in an embodiment, the transceiver module 702 is further configured to receive second indication information from the network device, where the second indication information is used to indicate at least one of the following:

at least one of a priority of a cell directly supporting the non-public network service, a priority of a cell indirectly supporting the non-public network service, or a priority of the public network cell.

The communication apparatus in this embodiment may be configured to execute the technical solutions corresponding to the terminal device in the method embodiments shown in FIG. 2 to FIG. 4. Implementation principles and technical effects thereof are similar, and details are not described herein again.

An embodiment of this application further provides a readable storage medium, where the readable storage medium stores a computer program; and when the computer program is executed, the communication method corresponding to the terminal device in the foregoing method embodiments is implemented.

An embodiment of this application further provides a readable storage medium, where the readable storage medium stores a computer program; and when the computer program is executed, the communication method corresponding to the network device in the foregoing method embodiments is implemented.

It should be understood that, the processor mentioned in the embodiments of this application may be a central processing unit (Central Processing Unit, CPU), or may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in the embodiments of this application may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA or another programmable logic device, a discrete gate or a transistor logic device, or a discrete hardware component, the memory (storage module) is integrated into the processor.

It should be noted that the memory described in this specification is intended to include but is not limited to these and any memory of another appropriate type.

It should be noted that, in the embodiments of this application, division into the modules is an example, and is merely logical function division. During actual implementation, another division manner may be used. Function modules in the embodiments of this application may be integrated into one processing module, or each of the modules may exist alone physically, or two or more modules are integrated into one module. The integrated module may be implemented in a form of hardware, or may be implemented in a form of a software function module.

When the integrated module is implemented in the form of a software function module and sold or used as an independent product, the integrated module may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor (processor) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, an optical disc, or the like.

All or some of the foregoing embodiments may be implemented by software, hardware, firmware, or any combination thereof. When the software is used for implementation, all or some of the embodiments may be implemented in a form of a computer program product. The computer program product includes one or more computer instructions. When the computer program instructions are loaded and executed on a computer, all or some of the procedure or functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (Solid State Disk, SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
receiving, by a terminal device, non-public network measurement configuration information from a network device, wherein the non-public network measurement configuration information is used by the terminal device to determine a cell to be measured, and wherein the non-public network measurement configuration information comprises a physical cell identifier (PCI) of a non-public network cell;
obtaining, by the terminal device, measurement results of N cells based on the non-public network measurement configuration information, wherein N is an integer greater than or equal to 1; and
determining, by the terminal device based on the measurement results of the N cells, a target cell on which the terminal device is to camp.

2. The method according to claim 1, wherein the non-public network measurement configuration information further comprises first indication information, and wherein the first indication information is used to indicate a manner in which the non-public network cell supports a non-public network service.

3. A communication apparatus, comprising:
at least one processor; and
one or more memories coupled to the at least one processor and storing programming instructions for execution by the at least one processor to:
receive non-public network measurement configuration information from a network device, wherein the non-public network measurement configuration information is used by the communication apparatus to determine a cell to be measured, and wherein the non-public network measurement configuration information comprises a physical cell identifier (PCI) of a non-public network cell;
obtain measurement results of N cells based on the non-public network measurement configuration information, wherein N is an integer greater than or equal to 1; and
determine, based on the measurement results of the N cells, a target cell on which the communication apparatus is to camp.

4. The apparatus according to claim 3, wherein the non-public network measurement configuration information further comprises first indication information, and wherein the first indication information is used to indicate a manner in which the non-public network cell supports a non-public network service.

5. A non-transitory computer readable storage medium comprising instructions that, when executed by at least one processor, cause the at least one processor to:
receive non-public network measurement configuration information from a network device, wherein the non-public network measurement configuration information is used by a terminal device to determine a cell to be measured, and wherein the non-public network measurement configuration information comprises a physical cell identifier (PCI) of a non-public network cell;
obtain measurement results of N cells based on the non-public network measurement configuration information, wherein N is an integer greater than or equal to 1; and
determine, based on the measurement results of the N cells, a target cell on which the terminal device is to camp.

6. The non-transitory computer readable storage medium according to claim 5, wherein the non-public network measurement configuration information further comprises first indication information, and wherein the first indication information is used to indicate a manner in which the non-public network cell supports a non-public network service.

* * * * *